US008705747B2

(12) United States Patent
Lee et al.

(10) Patent No.: US 8,705,747 B2
(45) Date of Patent: Apr. 22, 2014

(54) OBJECT-BASED 3-DIMENSIONAL AUDIO SERVICE SYSTEM USING PRESET AUDIO SCENES

(75) Inventors: Yong-Ju Lee, Daejon (KR); Tae-Jin Lee, Daejon (KR); Jae-Hyoun Yoo, Daejon (KR); Kyeong-Ok Kang, Daejon (KR); Jin Woo Hong, Daejon (KR); In-Seon Jang, Daejon (KR); Jeong-Il Seo, Daejon (KR); Dae-Young Jang, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 928 days.

(21) Appl. No.: 12/300,720

(22) PCT Filed: May 16, 2007

(86) PCT No.: PCT/KR2007/002395
§ 371 (c)(1),
(2), (4) Date: Nov. 13, 2008

(87) PCT Pub. No.: WO2007/136187
PCT Pub. Date: Nov. 29, 2007

(65) Prior Publication Data
US 2009/0147961 A1 Jun. 11, 2009

(30) Foreign Application Priority Data
May 19, 2006 (KR) .................. 10-2006-0045184

(51) Int. Cl.
H04H 20/47 (2008.01)
(52) U.S. Cl.
USPC ..................... 381/2; 381/1; 381/17
(58) Field of Classification Search
USPC .............. 381/17–23, 1, 2; 700/94; 704/200.1
See application file for complete search history.

(56) References Cited

U.S. PATENT DOCUMENTS

| 5,590,207 A | 12/1996 | Taylor |
| 6,163,510 A * | 12/2000 | Lee et al. ...................... 386/281 |
| 6,665,318 B1 * | 12/2003 | Tomokane et al. ........... 370/535 |
| 2004/0111171 A1 * | 6/2004 | Jang et al. ....................... 700/94 |

(Continued)

FOREIGN PATENT DOCUMENTS

| JP | 2000-358294 A | 12/2000 |
| JP | 2002-171228 A | 6/2002 |

(Continued)

OTHER PUBLICATIONS

Taejin Lee, et al; "Object-based 3D Audio Broadcasting System through Terrestrial-DMB", (2005 ISSN 1225-441X, vol. 24-2(s), pp. 267-268, Nov. 10, 2005 by Accoustical Society of Korea).

(Continued)

Primary Examiner — Cuong Q Nguyen
Assistant Examiner — Yosef Gebreyesus
(74) Attorney, Agent, or Firm — Ladas & Parry LLP

(57) ABSTRACT

Provided are an object-based three dimensional (3-D) audio service system using preset audio scenes and a method thereof. The system and the method are suggested for enabling a user to easily and conveniently watch and listen an object based 3-D audio service by eliminating inconvenience that requires a user to control each of object audio signals of sound sources. The system includes: audio input means for inputting an audio signal; preset audio scene generating means for extracting object audio signals from the audio signal inputted through the audio input means and generating more than one of 3-D audio scene information by arranging the extracted object audio signals in a 3-D space and editing features of each object; and encoding means for encoding and multiplexing the audio signal and the 3-D audio scene information for each object audio signal.

13 Claims, 4 Drawing Sheets

(56) References Cited

U.S. PATENT DOCUMENTS

2006/0034361 A1* 2/2006 Choi et al. .................. 375/224
2007/0101249 A1* 5/2007 Lee et al. .................. 715/500.1

FOREIGN PATENT DOCUMENTS

| JP | 2005-293623 A | 10/2005 |
| KR | 2004-0037437 A | 5/2004 |
| WO | 2004/051624 A2 | 6/2004 |

OTHER PUBLICATIONS

International Search Report; International Application No. PCT/KR2007/002395.

Taejin Lee, et al; "An Object-based 3D Audio Broadcasting System for Interactive Service", Audio Engineering Society Convention Paper 6384 Presented at the 118$^{th}$ Convention May 28-31, 2005, Barcelona, Spain, 8 pages.

Hari Kalva, et al; "Delivering Object-Based Audio-Visual Services", IEEE Transactions on Consumer Electronics, vol. 45, No. 4, Nov. 1999, 4 pages.

Olivier Avaro, et al; "The MPEG-4 systems and description languages: A way ahead in audio visual information representation", Signal Processing: Image Communication vol. 9, Issue 4, May 1997, pp. 385-431.

* cited by examiner

OBJECT-BASED 3-DIMENSIONAL AUDIO SERVICE SYSTEM USING PRESET AUDIO SCENES

TECHNICAL FIELD

The present invention relates to an object-based three dimensional (3-D) audio service system using preset audio scenes and a method thereof; and, more particularly, to an object-based 3-D audio service system using preset audio scenes and a method thereof for providing an interactive service that enables a user or a viewer to directly form an audio scene using a 3-D audio related technology for providing realistic broadcasting to a user or a viewer.

BACKGROUND ART

FIG. 1 is a diagram illustrating a conventional audio service system.

As shown in FIG. 1, the conventional audio service system includes an audio service providing apparatus 10 and an audio service reproducing apparatus 20. The audio service providing apparatus 10 includes an audio-capture unit 11 for capturing an audio signal such as sound, an editing/mixing unit 12 for editing and mixing the captured audio signal to transmit the audio signal to an audio service reproducing apparatus 20, and a storing/transmitting unit 13 for storing the mixed audio signal and transmitting the mixed audio signal to the audio service reproducing apparatus 20.

The audio service reproducing apparatus 20 includes a receiver 21 for receiving an audio signal transmitted from the audio service providing apparatus 10, a controller 22 for controlling the received audio signal, and a reproducer 23 for reproducing an audio signal.

An audio signal, which is provided through broadcasting services such as TV broadcasting, radio broadcasting, and Digital Multimedia Broadcasting (DMB) based on the conventional audio service system, is generally created by mixing a plurality of audio signals captured from various sound sources. For example, an audio signal provided through a soccer game broadcasting is created by mixing noises in a soccer stadium, yelling of a crowd, and a voice of an announcer.

Although a user or a viewer can control the volume of the overall audio signal, it is impossible to control the volume of each object such as the voice of an announcer, the yelling of a crowd, and the noises of the soccer stadium. It is because the audio signal is transmitted after a plurality of object audio signals are mixed into one audio signal in a general broadcasting service.

However, if a transmitter such as the audio service providing apparatus 10 independently transmits object audio signals of the sound sources without the object audio signals of the sound sources mixed to one audio signal, a receiver such as the audio service reproducing apparatus 20 can independently control the volumes of the object audio signals of the sound sources. An object-based audio service denotes such an audio service that allows a user or a viewer to control each of the object audio signals at a receiver by independently transmitting the object audio signals of the sound sources through a transmitter.

For example, if an audio signal of a soccer game broadcasting is provided based on an object-based 3-D audio service, a user or a viewer can control each of objects, such as the noises in the soccer stadium, the yelling of the crowd, and the voices of an announcer to obtain a desired audio setting. That is, a user or a viewer can control the noise of the soccer stadium loud, the yelling of the crowd soft, and the voice of the announcer loud. Or, a viewer can control the audio signal to reproduce only the noises of the soccer stadium and the voice of an announcer without the yelling of the crowd reproduced.

Therefore, there is a great demand for developing a method for providing an object-based 3-D audio service that enables a user to control each of object audio signals of sound sources, which can be applied to all broadcasting services and multimedia services providing audio such as digital broadcasting, radio broadcasting, Digital Multimedia Broadcasting, Internet broadcasting, digital movie, DVD, moving picture contents.

Although a conventional object-based 3-D audio system and a control method thereof was introduced in Korean Patent Publication No. 10-2004-0037437, published on May 7, 2004, the conventional object-based 3-D audio system requires a user to control each of object audio signals of sound sources to set the audio signals according to user's preference. Therefore, it is very annoying to a user or a viewer.

DISCLOSURE

Technical Problem

An embodiment of the present invention is directed to providing an object-based three dimensional (3-D) audio service system and a method thereof for enabling a user to easily and conveniently watch and listen an object-based 3-D audio service by eliminating inconvenience that requires a user to control each of object audio signals of sound sources.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an object-based three dimensional (3-D) audio service providing apparatus using preset audio scenes, including: audio input means for inputting an audio signal; preset audio scene generating means for extracting object audio signals from the audio signal inputted through the audio input means and generating more than one of 3-D audio scene information by arranging the extracted object audio signals in a 3-D space and editing features of each object; and encoding means for encoding and multiplexing the audio signal and the 3-D audio scene information for each object audio signal.

In accordance with another aspect of the present invention, there is provided an object-based 3-D audio service reproducing apparatus using preset audio scenes including: decoding means for de-multiplexing and decoding object-based 3-D audio contents; audio scene forming means for forming 3-D audio scene information according to one selected from a plurality of 3-D audio scene information in the de-multiplexed and decoded object-based 3-D audio contents by a user including a viewer; audio signal mixing means for controlling features of objects in an audio signal of the de-multiplexed and decoded object-based 3-D audio contents according to the formed 3-D audio scene information; and reproducing means for reproducing the audio signal with one of the features controlled.

In accordance with another aspect of the present invention, there is provided a method for providing an object-based 3-D audio service using preset audio scenes, including the steps of: inputting an audio signal; extracting object audio signals from the inputted audio signal and generating more than one of 3-D audio scene information by arranging the extracted object audio signals in a 3-D space and editing features of each object; and encoding and multiplexing the audio signal and the 3-D audio scene information for each object audio signal.

In accordance with another aspect of the present invention, there is provided a method for reproducing object-based 3-D audio service using preset audio scenes including the steps of: de-multiplexing and decoding object-based 3-D audio contents; forming 3-D audio scene information according to one selected from a plurality of 3-D audio scene information in the de-multiplexed and decoded object-based 3-D audio contents by a user including a viewer; controlling features of objects in an audio signal of the de-multiplexed and decoded object-based 3-D audio contents according to the formed 3-D audio scene information; and reproducing the audio signal with one of the features controlled.

Advantageous Effects

An object-based three dimensional (3-D) audio service system and a method thereof according to the present invention provides previously generated preset audio scenes to a user or a viewer with an object-based 3-D audio service applied to all broadcasting services and multimedia services providing audio, such as digital broadcasting, radio broadcasting, Digital Multimedia Broadcasting (DMB), Internet broadcasting, digital movies, Digital Video Disk (DVD), and moving picture contents. Therefore, the object-based 3-D audio service system and a method thereof according to the present invention eliminates the inconvenience of a user to control each of object audio signals of sound sources and enables the user to easily and conveniently watch and listen the object-based 3-D audio service.

The present invention can be applied to broadcasting services and multimedia services providing audio, such as digital broadcasting, radio broadcasting, DMB, Internet broadcasting, digital movies, DVD, and moving picture contents, and the present invention is not limited to the types of mediums for transmitting and storing object-based audio contents for broadcasting and multimedia services providing audio.

BEST MODE FOR THE INVENTION

The advantages, features and aspects of the invention will become apparent from the following description of the embodiments with reference to the accompanying drawings, which is set forth hereinafter.

Figure 1:
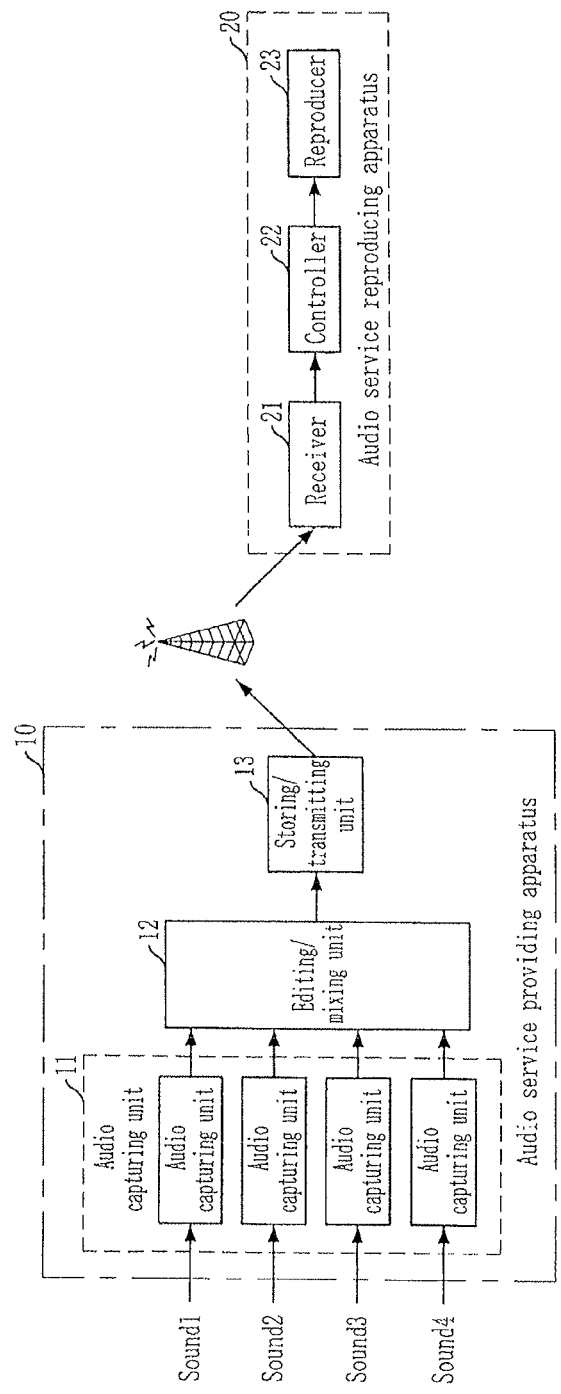
FIG. 1 is a diagram illustrating a conventional audio service system.
Figure 2:
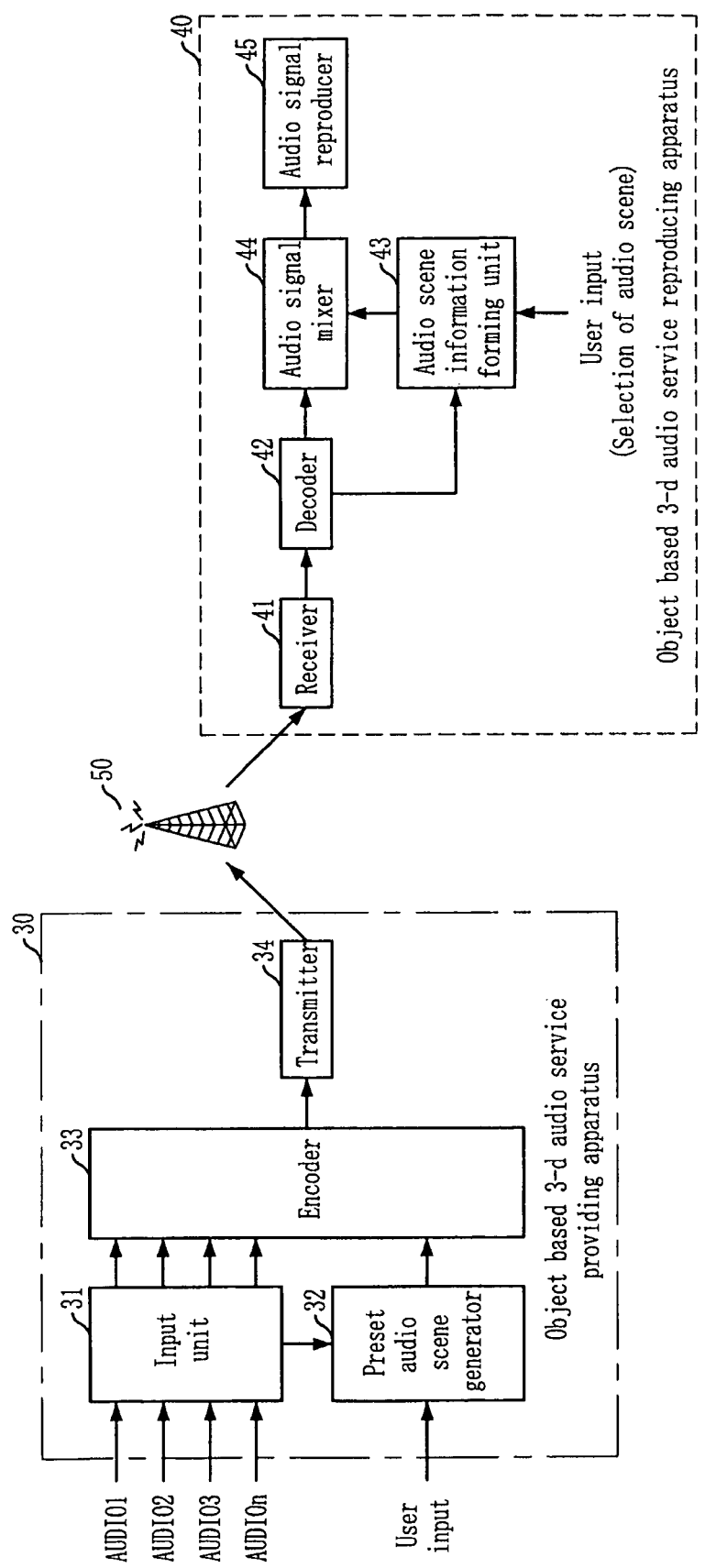
FIG. 2 is a block diagram illustrating an object-based three-dimensional (3-D) audio service system using preset audio scenes in accordance with an embodiment of the present invention.

FIG. 2 is a block diagram illustrating an object-based three-dimensional (3-D) audio service system using preset audio scenes in accordance with an embodiment of the present invention.

As shown in FIG. 2, the object-based 3-D audio service system includes an object-based 3-D audio service providing apparatus 30, a transmitting medium 50, and an object-based 3-D audio service reproducing apparatus 40. The 3-D service providing apparatus 30 receives an audio signal through various input devices, creates more than one of object-based 3-D audio scene information which can be selected by a user or a viewer, and transmits the created object-based 3-D audio scene information to the object-based 3-D audio service reproducing apparatus 40. The transmitting medium 50 is a medium such as a digital broadcasting network or an Internet network for connecting the object-based 3-D audio service providing apparatus 30 and the object-based 3-D audio service reproducing apparatus 40 through a network. The object-based 3-D audio service reproducing apparatus 40 generates more than one of 3-D audio scenes based on the object-based 3-D audio scene information transmitted from the object-based 3-D audio service providing apparatus 30.

Hereinafter, the constituent elements of the object-based 3-D audio service system using preset audio scenes according to the present embodiment will be described in detail.

The object-based 3-D audio service providing apparatus 30 includes an input unit 31, a preset audio scene generator 32, an encoder 33, and a transmitter 34. The input unit 31 receives audio signals through various input devices. The preset audio scene generator 32 extracts object-based audio signals (hereinafter, object audio signals) from the audio signal received through the input unit 31, arranges the extracted object audio signals in a three dimensional space, and creates more than one of 3-D audio scene information by editing features such as a location, a size, a direction, and a sound field environment of each object. The encoder 33 encodes and multiplexes the audio signal inputted through the input unit 31 and the object-based 3-D audio scene information created by the preset audio scene generating unit 32 for transmitting the input audio signal and the generated preset audio scene information to the object-based 3-D audio service reproducing apparatus 40. For example, the input audio signals and the generated preset audio scene information are multiplexed to a moving picture experts group 4 (MPEG-4) file format in a digital broadcasting network. The transmitter 34 transforms the multiplexed object-based audio contents including the input audio signal and the created object-based 3-D audio scene information from the encoding unit 33 to a transport format. For example, the transmitter 34 transforms the multiplexed object-based audio contents to a MPEG-2 transport stream (TS) for a digital broadcasting network.

The transformed object-based audio contents including the input audio signal and the generated object-based 3-D audio scene information may be transmitted to the object-based 3-D audio reproducing apparatus 40 and may be stored in a storing medium.

The transmitter 34 may transmit the object-based audio contents including the input audio signal and the object-based 3-D audio scene information to the object-based 3-D audio reproducing apparatus 40 through a digital broadcasting network such as a terrestrial DMB channel 50.

If the sound source of the audio signal inputted to the input unit 31 is a mixed sound source, the preset audio scene generator 32 uses a Convolutive Blind Source Separation technique to extract object audio signals. Especially, the preset audio scene generator 32 forms more than one of object-based 3-D audio scene information by controlling a ratio of each object-based the audio scene information of each object audio signal, which is set according to the control of a user such as an editor.

The object-based 3-D audio service reproducing apparatus 40 includes a decoder 42, an audio scene information forming unit 43, an audio signal mixer 44, and an audio signal reproducer 45. The decoder 42 de-multiplexes and decodes object-based audio contents including an audio signal and object-based 3-D audio scene information for reproducing. The audio scene information forming unit 43 provides the object-based 3-D audio scene information of the object-based 3-D audio contents, which is de-multiplexed and decoded by the decoder 42, to a user such as a viewer to select, and forms the object-based 3-D audio scene information according to the user selection. The audio signal mixer 44 mixes object audio signals of the audio signal of the de-multiplexed and decoded object-based 3-D audio contents from the decoder 42 by controlling features of each object, such as a location, a direction, a size, and a sound field of each object according to the object-based 3-D audio scene information formed by the audio scene information forming unit 43. The audio signal reproducer 45 reproduces the audio signal mixed to one object-based 3-D audio scene by the audio signal mixer 44.

The object-based audio contents including the audio signal and the object-based 3-D audio scene information may be provided through a broadcasting service or a multimedia service such as digital broadcasting, radio broadcasting, Digital Multimedia Broadcasting (DMB), Internet broadcasting, digital movies, Digital Video Disk (DVD), and moving picture contents. Although the object-based audio contents may be received through the receiver 41 in the present embodiment, the present invention is not limited thereto. That is, the object-based audio contents may be provided through a transmission medium or a storage medium that can provide a broadcasting service or a multimedia service that provides an audio.

The audio scene information forming unit 43 enables a user or a viewer to select features of objects such as a location, a direction, a volume, and a sound field environment of each object and forms new object-based 3-D audio scene information according to the features including a location, a direction, a volume, and a sound field environment of each object set by the user.

A user or a viewer can control features of a 3-D audio space by changing a reverberation time of a 3-D space through controlling a volume and a delay time of an initial reflected sound through the audio scene information forming unit 43.

That is, the object-based 3-D audio service system using the preset audio scene according to the present embodiment previously generates object-based 3-D audio scenes that are expected to be frequently used and provides the generated object-based 3-D audio scenes as preset audio scenes to a user or a viewer. That is, the object-based 3-D audio service system according to the present embodiment enables a user or a viewer to select one of the preset audio scenes in order to make a user to conveniently watch and listen a broadcasting program with the desired audio preference.

For example, noises of a soccer stadium, yelling of a crowd, a voice of an announcer are defined as audio objects for a soccer game broadcasting, and the defined audio objects are transmitted independently. With the audio objects, a first audio scene having information about volume of the noises of soccer stadium, the yelling of a crowd, and the voice of an announcer set to 1:1:1, a second audio scene having information about volume of the noises of a soccer stadium, the yelling of a crowd, and the voice of an announcer set to 1:0.5:1, and an audio scene having information about volume of the noises of a soccer stadium, the yelling of a crowd, and the voice of an announcer set to 1:0:1 are transmitted as the preset audio scenes. Then, a user or a viewer selects one of the preset audio scenes to watch and listen the soccer game broadcasting with the desired audio preference.

A user may directly control each of the audio objects if the user cannot find a desired audio scene from the provided audio scenes. However, it is preferable to provide a large number of preset audio scenes to a user in order to enable the user to find a desired audio scene from the provided preset audio scenes.

Figure 3:
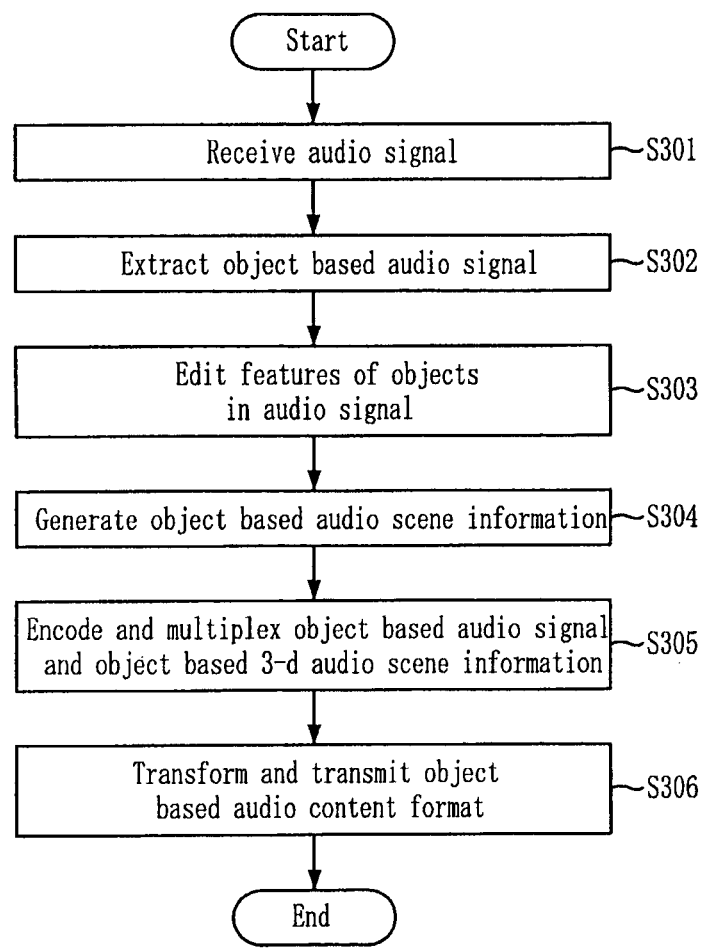
FIG. 3 is a flowchart illustrating a method for providing an object-based 3-D audio service using preset audio scenes in accordance with an embodiment of the present invention.

FIG. 3 is a flowchart illustrating a method for providing an object-based 3-D audio service using preset audio scenes in accordance with an embodiment of the present invention.

Referring to FIG. 3, the input unit 31 of the object-based 3-D audio service providing apparatus 30 receives an object-based audio signal through various input devices at step S301.

The preset audio scene generator 32 extracts object-based audio signals, that is, object audio signals, from the audio signal inputted through the input unit 31 at step S302. Then, the preset audio scene generator 32 generates more than one of object-based 3-D audio scene information at step S304 by arranging the extracted object audio signals in a 3-D space and editing the features of each object audio signal such as a location, a direction, a volume, and a sound field environment of the audio object at step S303. The encoder 33 encodes and multiplexes the audio signal inputted through the input unit 31 and the object-based 3-D audio scene information generated by the preset audio scene generator 32 at step S305. For example, the encoder 33 encodes and multiplexes the audio signal and the object-based 3-D audio scene information into MPEG-4 file format for a digital broadcasting network.

Then, the transmitter 34 transforms the multiplexed object-based audio contents including the audio signal and the object-based 3-D audio scene information to be proper to a transport format and transmits the transformed object-based audio contents at step S306. For example, the multiplexed object-based audio contents are transformed to a MPEG-2 TS in a digital broadcasting network.

For example, the transmitter 34 transmits the transformed object-based audio contents including the audio signal and the object-based 3-D audio scene information to the object-based 3-D audio reproducing apparatus 40 through a digital broadcasting network such as a terrestrial DMB channel. The transformed object-based audio contents including the audio signal and the object-based 3-D audio scene information may be stored in a storing medium.

Figure 4:
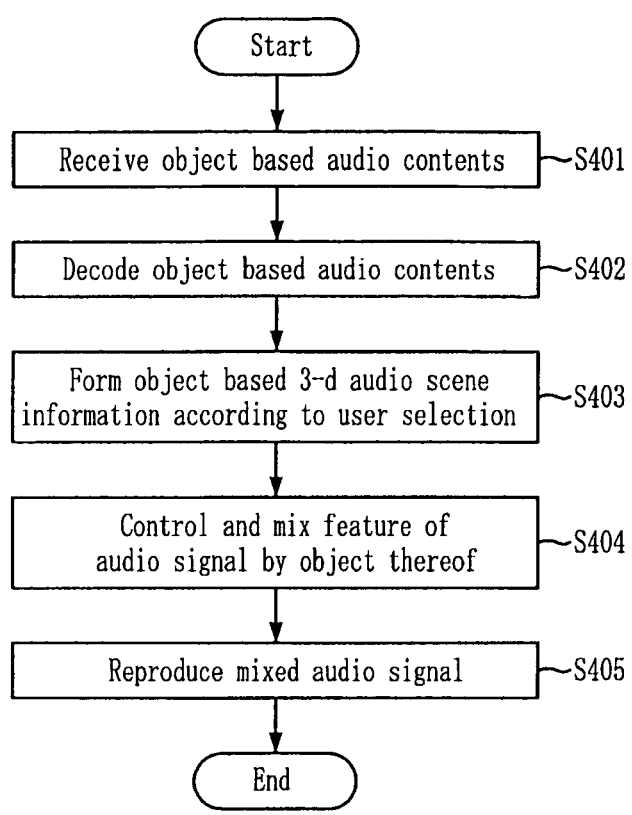
FIG. 4 is a flowchart illustrating a method for reproducing an object-based 3-D audio service using preset audio scenes in accordance with the embodiment of the present invention.

FIG. 4 is a flowchart illustrating a method for reproducing an object-based 3-D audio service using preset audio scenes in accordance with an embodiment of the present invention.

Referring to FIG. 4, the receiver 41 of the object-based 3-D audio service reproducing apparatus 40 receives the object-based audio contents including an audio signal and object-based 3-D audio information through, for example, a digital broadcasting network such as a terrestrial DMB channel 50 or the Internet network at step S401.

The receiver 41 may receive the object-based audio contents through a transmission medium that can provide a broadcasting service or a multimedia service that provides an audio. Or, the object-based audio contents may be inputted through the storing medium.

The decoder 42 de-multiplexes and decodes the received or inputted object-based audio contents including the audio signal and the object-based 3-D audio scene information at step S402. The audio scene information forming unit 43 provides the object-based 3-D audio scene information of the de-multiplexed and decoded object-based 3-D audio contents to a user or a viewer to select, and forms object-based 3-D audio scene information according to the user selection at step S403.

Then, the audio signal mixer 44 mixes object audio signals by controlling features of objects in the audio signal of the de-multiplexed and decoded object-based 3-D audio contents, such as a location, a direction, a volume, and a sound field environment of each audio object, according to the object-based 3-D audio scene information formed by the audio scene information forming unit 43 at step S404. Finally, the audio signal reproducer 45 reproduces the audio signal mixed based on one of the object-based 3-D audio scenes by the audio signal mixer 44 at step S405.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

What is claimed is:

1. An object-based three dimensional (3-D) audio service providing apparatus using preset audio scenes, comprising:
   audio input means for inputting a plurality of different audio signals;
   preset audio scene generating means is configured to generate the preset audio scenes by:
   extracting object audio signals from the different audio signals inputted through the audio input means,
   generating more than one of 3-D audio scene information from the extracted object audio signals by arranging the extracted object audio signals in a 3-D space, and
   editing features of each of the extracted object,
   wherein the arrangement of the extracted object audio signal in the 3-D space are configured to be generated prior to the different audio signals being inputted through the audio input means; and
   encoding means for encoding and multiplexing the audio signal and the 3-D audio scene information for each object audio signal.

2. The object-based 3-D audio service providing apparatus of claim 1, further comprising processing means for processing the encoded and multiplexed object-based 3-D audio contents.

3. The object-based 3-D audio service providing apparatus of claim 2, wherein the processing means transmits the encoded and multiplexed object-based 3-D audio contents to an audio reproducing terminal through a digital broadcasting network.

4. The object-based 3-D audio service providing apparatus of claim 3, wherein the audio reproducing terminal forms a 3-D scene using the 3-D audio scene information and reproduces the audio signal using the formed 3-D scene.

5. The object-based 3-D audio service providing apparatus of claim 1, wherein the features comprise at least one among a location, a volume, a direction, and a sound field environment of each object.

6. The object-based 3-D audio service providing apparatus of claim 1, wherein the audio scene generating means extracts the object audio signals using a Convolutive Blind Source Separation technique when a sound source of the input audio signal is a mixed sound source.

7. The object-based 3-D audio service providing apparatus of claim 1, wherein the audio scene generating means generates at least one among 3-D audio scene information by controlling a ratio of each object-based on audio scene information of each object audio signal, which is set according to control of a user including a viewer.

8. An object-based three dimensional (3-D) audio service reproducing apparatus using a plurality of preset audio scenes comprising:
   decoding means for de-multiplexing and decoding object-based 3-D audio contents;
   audio scene forming means for forming 3-D audio scene information according to one selected from a plurality of different 3-D audio scene information in the de-multiplexed and decoded object-based 3-D audio contents by a user including a viewer,
   wherein each of the formed 3-D scene information is configured to have the plurality of different 3-D audio scene information, and
   wherein the plurality of different 3-D audio scene information is configured to be automatically generated from a plurality of different audio signals, which is done without any input from the user including the viewer, and
   wherein the plurality of different audio signals are configured to be generated after the plurality of preset scenes have been generated;
   audio signal mixing means for controlling features of objects in an audio signal of the de-multiplexed and decoded object-based 3-D audio contents according to the formed different 3-D audio scene information; and
   reproducing means for reproducing the audio signal with one of the features controlled.

9. The object-based 3-D audio service reproducing apparatus of claim 8, wherein the audio scene forming means has a function of forming the different 3-D audio scene information according to features of each object, which are set by a user including a viewer.

10. The object-based 3-D audio service reproducing apparatus of claim 8, wherein the features includes at least one among a location, a volume, a direction, and a sound field environment of each object.

11. The object-based 3-D audio service reproducing apparatus of claim 10, wherein the audio scene forming means controls a feature of a 3-D audio space by changing a reverberation time of a 3-D audio space through controlling a volume and a delay time of an initial reflected sound.

12. An object-based audio reproducing apparatus comprising:
   decoding means for de-multiplexing and decoding object-based audio contents and a plurality of preset audio scenes;
   audio signal mixing means for controlling the object-based audio contents using preset audio scene selected from a plurality of preset audio scenes by user, and
   wherein each of the plurality of preset audio scenes is configured based on two or more different audio input signals;
   reproducing means the controlled object-based audio contents.

13. The object-based audio reproducing apparatus of claim 12, wherein the preset audio scene is related to volume of each of object-based audio signals of the two or more different audio input signals included in the object-based audio contents.

* * * * *